(12) United States Patent  
Carvill (10) Patent No.: US 7,979,210 B2
(45) Date of Patent: *Jul. 12, 2011

(54) CORRECTION FOR ERRORS CAUSED BY VARIATION IN WATER CONDITIONS

(75) Inventor: Charles Vincent Carvill, Katy, TX (US)

(73) Assignee: WesternGeco L.L.C., Houston, TX (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/346,442

(22) Filed: Dec. 30, 2008

(65) Prior Publication Data

US 2009/0112477 A1 Apr. 30, 2009

Related U.S. Application Data

(63) Continuation of application No. 11/745,867, filed on May 8, 2007, now Pat. No. 7,496,452.

(60) Provisional application No. 60/911,779, filed on Apr. 13, 2007.

(51) Int. Cl.
*G01V 1/00* (2006.01)
(52) U.S. Cl. .......................................................... 702/14
(58) Field of Classification Search ...................... 702/14
See application file for complete search history.

(56) References Cited

U.S. PATENT DOCUMENTS 6,151,556 A * 11/2000 Allen .............................. 702/18
2007/0268780 A1* 11/2007 Moore ............................ 367/21

* cited by examiner

*Primary Examiner* — Aditya Bhat (57) ABSTRACT

Method for processing seismic data to correct for errors caused by variation in water conditions. In one implementation, the method may include (a) applying a dip correction to a plurality of observed water bottom reflection times using a model water velocity and an estimate of geologic dip; (b) applying a normal moveout (NMO) correction to the dip corrected observed water bottom reflection times using the model water velocity; (c) applying a common mid point ("CMP") bin centering correction to the NMO corrected, dip corrected observed water bottom reflection times using the model water velocity and the estimate of geologic dip; (d) solving for $\Delta s_i$, which is an estimate of the difference in slowness between the observed water bottom reflection times and the water bottom reflection times that would have been observed had the water velocity been the same as the model water velocity; (e) solving for an estimate of observed water velocity based on $s_{obs,i} = s_m + \Delta s_i$, where $s_{obs,i}$ is an estimate of observed slowness and $s_m$ is defined as the model slowness; (f) layer replacing the observed water bottom reflection times using the estimate of the observed water velocity and the model water velocity; and (g) repeating steps (a) to (f) using the layer replaced observed water bottom reflection times until the changes in the estimate of observed water velocity approach zero.

20 Claims, 10 Drawing Sheets

CORRECTION FOR ERRORS CAUSED BY VARIATION IN WATER CONDITIONS

RELATED APPLICATIONS

This application is a continuation of U.S. patent application Ser. No. 11/745,867, now a U.S. Pat. No. 7,496,452, filed May 8, 2007, and titled CORRECTION FOR ERRORS CAUSED BY VARIATION IN WATER CONDITIONS; which claims the benefit of and priority to U.S. Provisional Patent Application Ser. No. 60/911,779, filed Apr. 13, 2007, and titled CORRECTION FOR ERRORS CAUSED BY VARIATION IN WATER CONDITIONS. The entire disclosures of each of these applications are herein incorporated by reference.

FIELD

Implementations of various techniques described herein generally relate to marine seismic surveying, and more particularly, to correcting for errors caused by variation in water conditions.

BRIEF DESCRIPTION OF THE RELATED ART

The following descriptions and examples do not constitute an admission as prior art by virtue of their inclusion within this section.

Seismic exploration may be used to locate and/or survey subterranean geological formations for hydrocarbon deposits. Since many commercially valuable hydrocarbon deposits are located beneath bodies of water, various types of marine seismic surveys have been developed. In a typical marine seismic survey, such as the exemplary survey illustrated in FIG. 1, an array 100 of marine seismic streamer cables 105 may be towed behind a survey vessel 10 over a survey area 115. The seismic streamer cables 105 may be several thousand meters long and contain a large number of sensors 125, such as hydrophones and associated electronic equipment, which may be distributed along the length of the each seismic streamer cable 105. The survey vessel 110 may also tow one or more seismic sources 120, such as airguns and the like.

Figure 1:
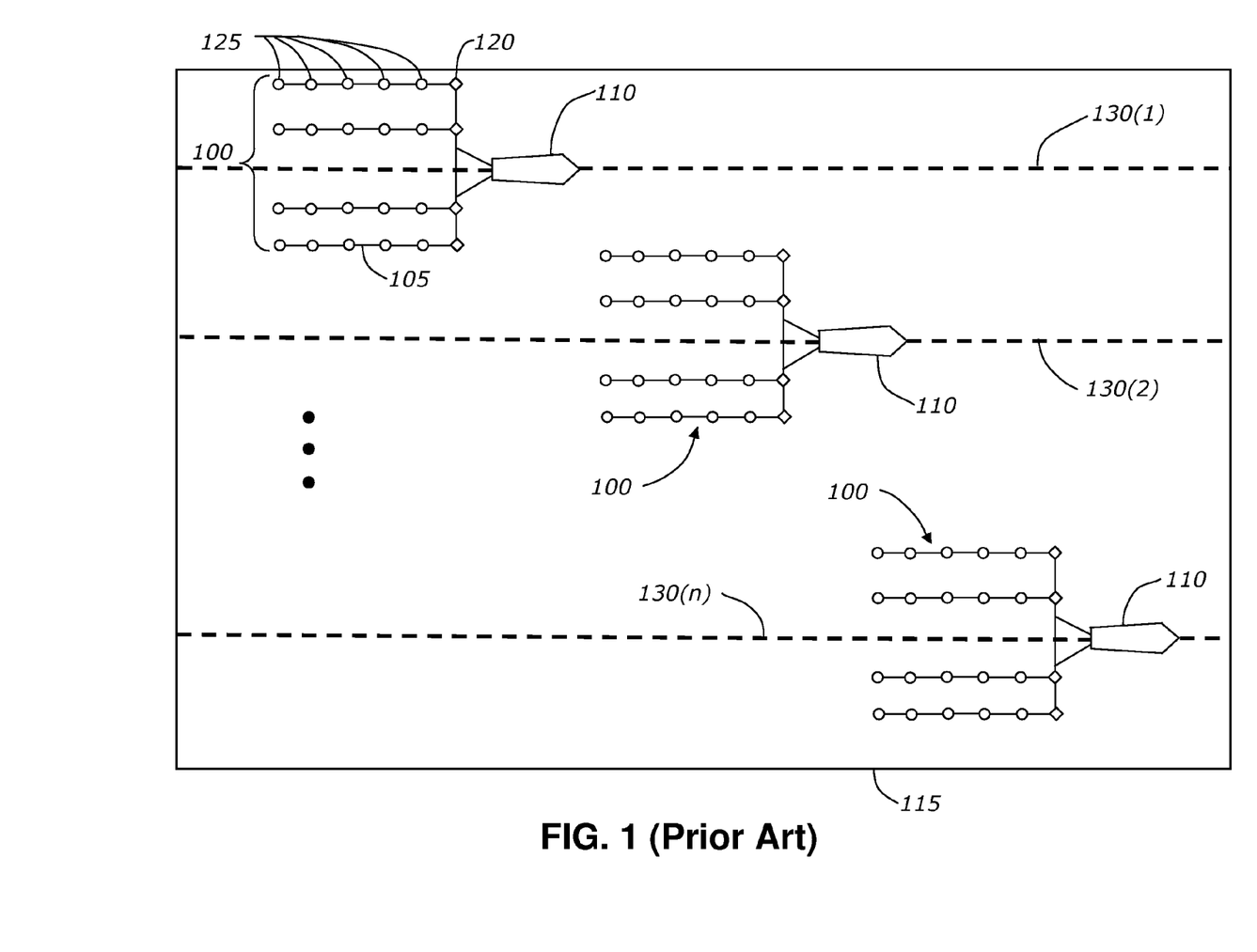
FIG. 1 illustrates a schematic diagram of a typical marine seismic survey.

As the array 100 is towed over the survey area 115, acoustic signals, or "shots," produced by the seismic sources 120 may be directed down through the water into the earth beneath (not shown), where they may be reflected from the various subterranean geological formations. The reflected signals may be received by the sensors 125 in the seismic streamer cables 105, digitized and then transmitted to the survey vessel 110. The digitized signals may be referred to as "traces" and may be recorded and at least partially processed at the survey vessel 110. The ultimate aim of this process is to build up a representation of the subterranean geological formations beneath the array 100. Analysis of the representation may indicate probable locations of hydrocarbon deposits in the subterranean geological formations.

Since the area of the array 100 is typically much smaller than the survey area 115, a representation of the earth strata in the survey area 115 may be formed by combining data collected along a plurality of sail lines 130(1-n). For example, a single survey vessel 110 may tow a single array 100 along each of the sail lines 130(1-n). Alternatively, a plurality of survey vessels 110 may tow a plurality of arrays 100 along a corresponding plurality of the sail lines 130(1-n). However, variations in the water conditions, e.g. water temperature, salinity, and the like, between the plurality of sail lines 130 (1-n) may cause variations in the velocity of sound in water among the sail lines 130(1-n). For example, the variations in seismic travel time can be on the order of 10 or 20 milliseconds for traces having a small distance between the source and detector for surveys carried out in deeper waters, e.g., greater than 200 m. The variations in the seismic wave travel times may shift the temporal position of the various events recorded in the seismic data, such as reflections and refractions of the seismic waves from the subterranean geological formations beneath the array 100. Consequently, the variations in the travel times may make it difficult to analyze the combined seismic data set and may reduce the accuracy of the survey.

Moreover, the data for the sail lines 130(1-n) may be collected at different times. For one example, a single pass along one of the sail lines 130(1-n) may take several hours to complete. As a result, if a single survey vessel 110 is used, data for the first sail line 130(1) may be recorded at an earlier time than data for the last sail line 130(n). For another example, inclement weather and/or high seas may force a survey to be suspended before resuming hours or days later. For yet another example, historical data from previous surveys performed months or years earlier may be combined with new data to extend the survey or to fill in deficiencies in coverage that may be introduced by currents, obstacles such as platforms, and the like. And for yet another example, data from repeat surveys may be used to analyze and monitor changes in productive oil and/or gas reservoirs.

Combining data from different times, and especially from different surveys, may exacerbate the aforementioned difficulties associated with variations in the velocity of sound in the water layer. For example, seasonal variations of the water temperature, salinity, and the like, may cause pronounced variations in the velocity of sound in water. For another example, shifts in water currents may cause unpredictable variations in the velocity of sound in water, particularly for surveys carried out near the edge of strong water currents.

The seismic data may be corrected for the variations in the velocity of sound in water by computing one or more so-called ?t values, which are typically defined as a difference between an expected travel time, usually based on an assumed ideal water velocity, and a measured travel time for one or more seismic signals. For example, the assumed ideal water velocity may be a constant velocity or one with very smooth spatial changes in velocity.

In one conventional method for determining the $\Delta t$ values (described in Wombell, R., 1996, "Water Velocity Variations In 3-D Seismic Processing," 66th Ann. Internat. Mtg: Society of Exploration Geophysicists, Expanded Abstracts, 1666-1669), normal move-out stacking velocities and zero offset water bottom reflection times are computed along adjacent sail lines. The velocities are then converted to zero offset travel time differences using the formula: $\Delta t = T_w (\Delta V_w / V_w)$, where $\Delta t$ is the difference in two-way travel time at zero offset due to the change in water velocity, $T_w$ is the zero offset water bottom reflection time, $V_w$ is the reference water velocity chosen by the practitioner, and $\Delta V_w$ is the difference between $V_w$ and the computed stacking velocity. The $\Delta t$ values are then applied to normal move-out corrected seismic data. One problem with this method is that the velocity analysis must be extremely accurate. Another issue is the effect of water bottom structure on the velocity analysis. If the dip of the water bottom, i.e., the angle the water bottom makes with a horizontal plane, changes between or along sail lines, the calculated velocities are strongly affected and may reduce the accuracy of the $\Delta t$ calculation.

SUMMARY

Described herein are implementations of various techniques for a method for processing seismic data to correct for errors caused by variation in water conditions. In one implementation, the method may include (a) applying a dip correction to a plurality of observed water bottom reflection times using a model water velocity and an estimate of geologic dip; (b) applying a normal moveout (NMO) correction to the dip corrected observed water bottom reflection times using the model water velocity; (c) applying a common mid point ("CMP") bin centering correction to the NMO corrected, dip corrected observed water bottom reflection times using the model water velocity and the estimate of geologic dip; (d) solving for $\Delta s_i$, which is an estimate of the difference in slowness between the observed water bottom reflection times and the water bottom reflection times that would have been observed had the water velocity been the same as the model water velocity; (e) solving for an estimate of observed water velocity based on $s_{obs,i} = s_m + \Delta s_i$, where $s_{obs,i}$ is an estimate of observed slowness and $s_m$ is defined as the model slowness; (f) layer replacing the observed water bottom reflection times using the estimate of the observed water velocity and the model water velocity; and (g) repeating steps (a) to (f) using the layer replaced observed water bottom reflection times until the changes in the estimate of observed water velocity approach zero.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

One goal of implementations of various techniques described herein is to simplify and improve the process of determining and applying corrections for water velocity variation to seismic data. Conventional methods are prone to errors due to oversimplification of the problem, dipping and complex water-bottom geometry, and irregular survey geometry. Gross errors generally require manual corrections. Smaller errors that are allowed to remain in the data often compromise the strength and sharpness of the final processed image.

Figure 2:
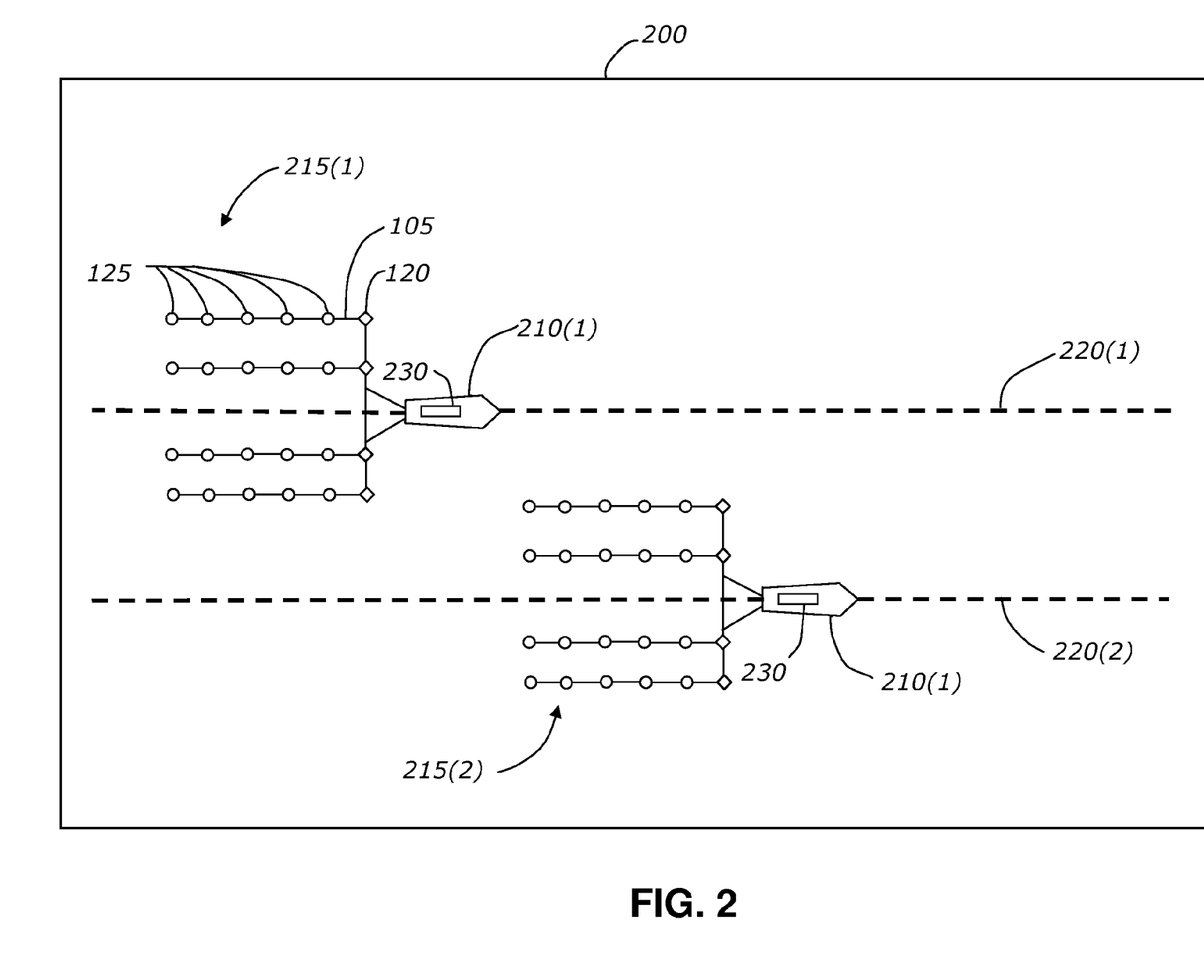
FIG. 2 illustrates a schematic diagram of a marine seismic survey area in connection with implementations of various techniques described herein.

FIG. 2 illustrates a marine seismic survey area 200 in connection with implementations of various techniques described herein. To survey the marine seismic survey area 200, one or more survey vessels 210(1-2) may tow one or more seismic arrays 215(1-2) over the marine seismic survey area 200. It will also be appreciated that, while the survey vessels 210(1-2) typically operate on the surface of the sea, the marine seismic survey area 200 may refer to a portion of the sea bed. Furthermore, although various implementations described herein are with reference to marine seismic surveying, it should be understood that some implementations may be applied to surveys undertaken in freshwater, brackish water and even in land seismic surveying.

The seismic arrays 215(1-2) may include a plurality of seismic sources 120 and seismic sensors 125, such as hydrophones, geophones, and the like, which may be coupled to the survey vessel 210(1-2) by cables 105. The seismic sources 120 and seismic sensors 125 may communicate with a signal processing unit 230 deployed on the survey vessels 210(1-2). In one implementation, the seismic sources 120 and seismic sensors 125 may communicate with the signal processing unit 230 via the cables 105. For example, the cables 105 may include wires, fiber-optic cables and the like, that may allow the seismic sources 120 and the seismic sensors 125 to exchange signals with the signal processing unit 230.

However, the seismic sensors 125 and seismic sources 120 may not always be deployed as a part of the seismic arrays 215(1-2). In some implementations, the seismic sensors 125 may be deployed on the ocean bottom instead of being towed behind the survey vessels 210(1-2). For example, the seismic sensors 125 may be deployed on one or more ocean-bottom cables ("OBC"). The OBCs may be deployed on the seafloor so that the seismic sensors 125 may record and relay data to the signal processing units 230 on the seismic survey vessels 210(1-2). Alternatively, the seismic sources 120 may be deployed on buoys (not shown). In another alternative implementation, the seismic sources 120 may be towed by a second vessel (not shown).

The survey vessels 210(1-2) may tow the seismic arrays 215(1-2) along a plurality of sail lines, such as the two sail lines 220(1-2). Although only two sail lines 220(1-2) are shown in FIG. 2, it should be understood that surveying the marine seismic survey area 200 may require more than two sail lines 220(1-2). For example, a survey covering an area of 40×70 miles may require about 160 sail lines 220(1-2), with each sail line 220(1-2) capturing about 1300 feet of subsurface coverage perpendicular to the direction of boat travel.

Furthermore, although the two sail lines 220(1-2) shown in FIG. 2 are depicted as being approximately adjacent, it should be understood that the two sail lines 220(1-2) may not be adjacent. In fact, the two sail lines 220(1-2) may even overlap.

Figure 3A:
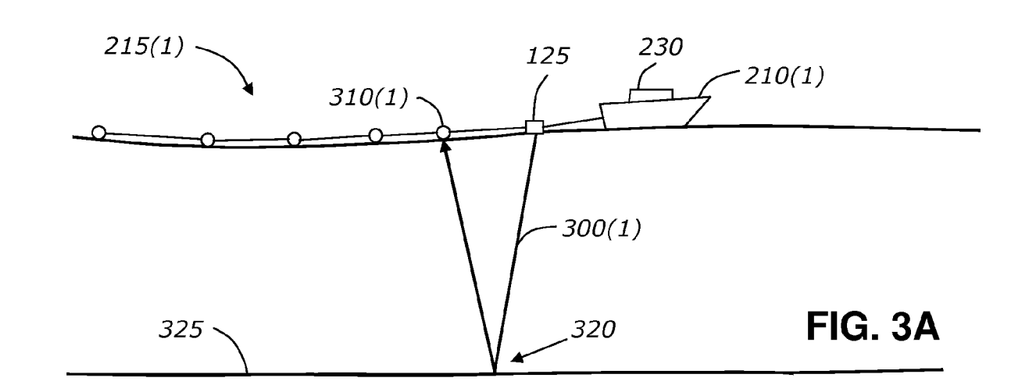
FIGS. 3A and 3B illustrate a side view of a survey vessel and a portion of the seismic array at two different locations in connection with implementations of various techniques described herein.
Figure 3B:
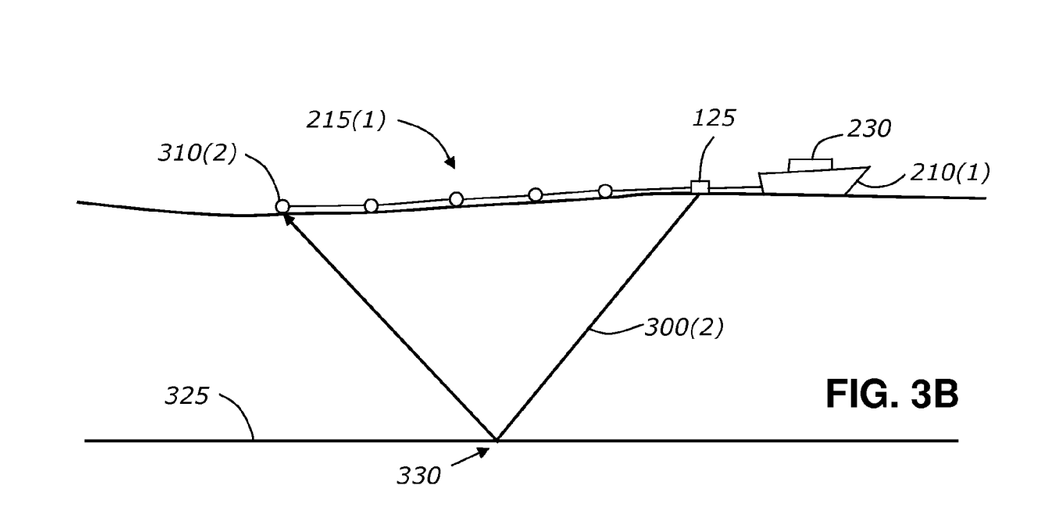

FIGS. 3A and 3B illustrate a side view of the survey vessel 210(1) and a portion of the seismic array 215(1) at two different locations. In operation, the seismic source 125 shown in FIG. 3A may provide an acoustic signal 300(1) that propagates to a seismic sensor 310(1) through a reflection point 320 located on a sea floor 325 between the seismic source 125 and the seismic sensor 310(1). Similarly, in FIG. 3B, the seismic source 125 may provide an acoustic signal 300(2) that propagates to a seismic sensor 310(2) through a reflection point 330. As illustrated in FIGS. 3A and 3B, the sea floor 325 appears to be flat and so the reflection points 320, 330 are half-way between the seismic source 125 and the seismic sensors 310(1-2). However, it should be understood that the reflection points 320, 330 may not necessarily be located half-way between the seismic source 125 and the seismic sensors 310(1-2). For example, a dipping sea floor 325 may change the location of the reflection points 320, 330.

In one implementation, signals may be generated by the seismic sensors 310(1-2) in response to receiving the reflected and/or refracted acoustic signals 300(1-2). The generated signals may then be transmitted to the signal processing unit 230 on the survey vessel 210(1-2). The signal processing unit 230 may in turn use the transmitted signals to form one or more traces representative of the reflected and/or refracted acoustic signals 300(1-2). The signals and/or the traces may be stored on any storage medium, including, but not limited to, recording tape, magnetic disks, compact disks, and DVDs. In some implementations, the signals may be transmitted to an on-shore facility in addition to or in lieu of storing the signals and/or the traces.

Figure 4:
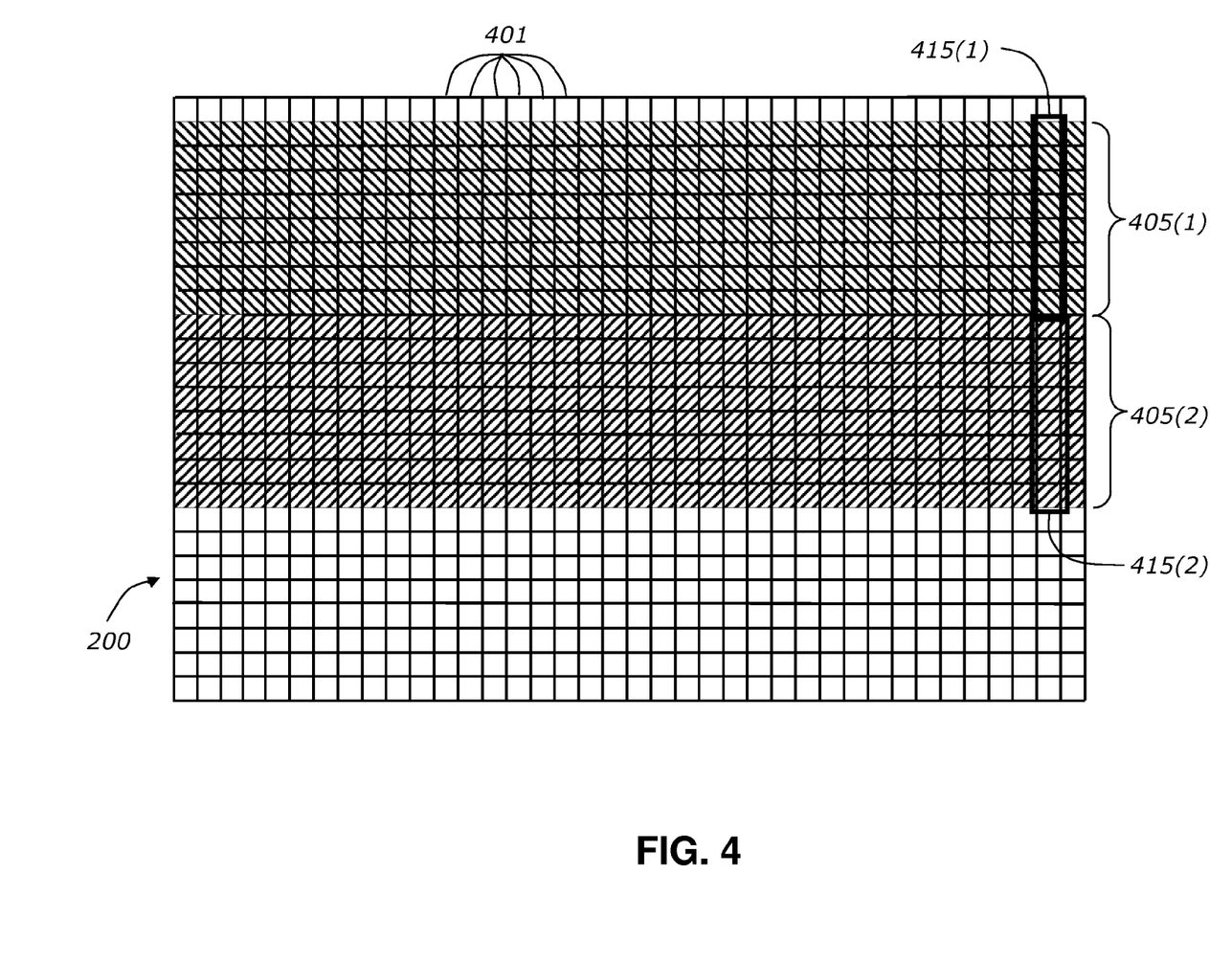
FIG. 4 illustrates a plurality of midpoint cells in the marine seismic survey area shown in FIG. 2 in connection with implementations of various techniques described herein.

The traces may be grouped according to the location of the reflection points 320, 330. For example, the marine seismic survey area 200 may be divided into a plurality of midpoint cells 401, as shown in FIG. 4. The signals provided by the seismic array 215(1) during a single pass over the marine seismic survey area 200 may have reflection points 320 (shown in FIG. 3A) that are distributed in a band 405(1) of midpoint cells 401. Similarly, the signals provided by the seismic array 215(2) during a single pass over the marine seismic survey area 200 may have reflection points 330 (shown in FIG. 3B) that are distributed in a band 405(2) of midpoint cells 401. Although the bands 415 (1-2) shown in FIG. 4 are depicted as adjacent, it should be understood that in some implementations the bands 415 (1-2) do not necessarily have to be adjacent.

Traces having a common midpoint cell 401 may be combined into a single data set to form a common midpoint (CMP) gather. This process may commonly be referred to as bringing the traces to a common midpoint. The midpoint cells 401 may be combined into cross-line groups 415(1-2). In one implementation, traces corresponding to the midpoint cells 401 in the cross-line group 415(1) may be combined to form a first sail-line/cross-line gather. Similarly, traces corresponding to the midpoint cells 401 in the cross-line group 415(2) may be combined to form a second sail-line/cross-line gather. In another implementation, traces associated with different sail lines 220(1-2) may be combined. For example, the traces corresponding to the midpoint cells 401 in the cross-line groups 415 (1-2) may all be combined to form a cross-line gather.

Figure 5:
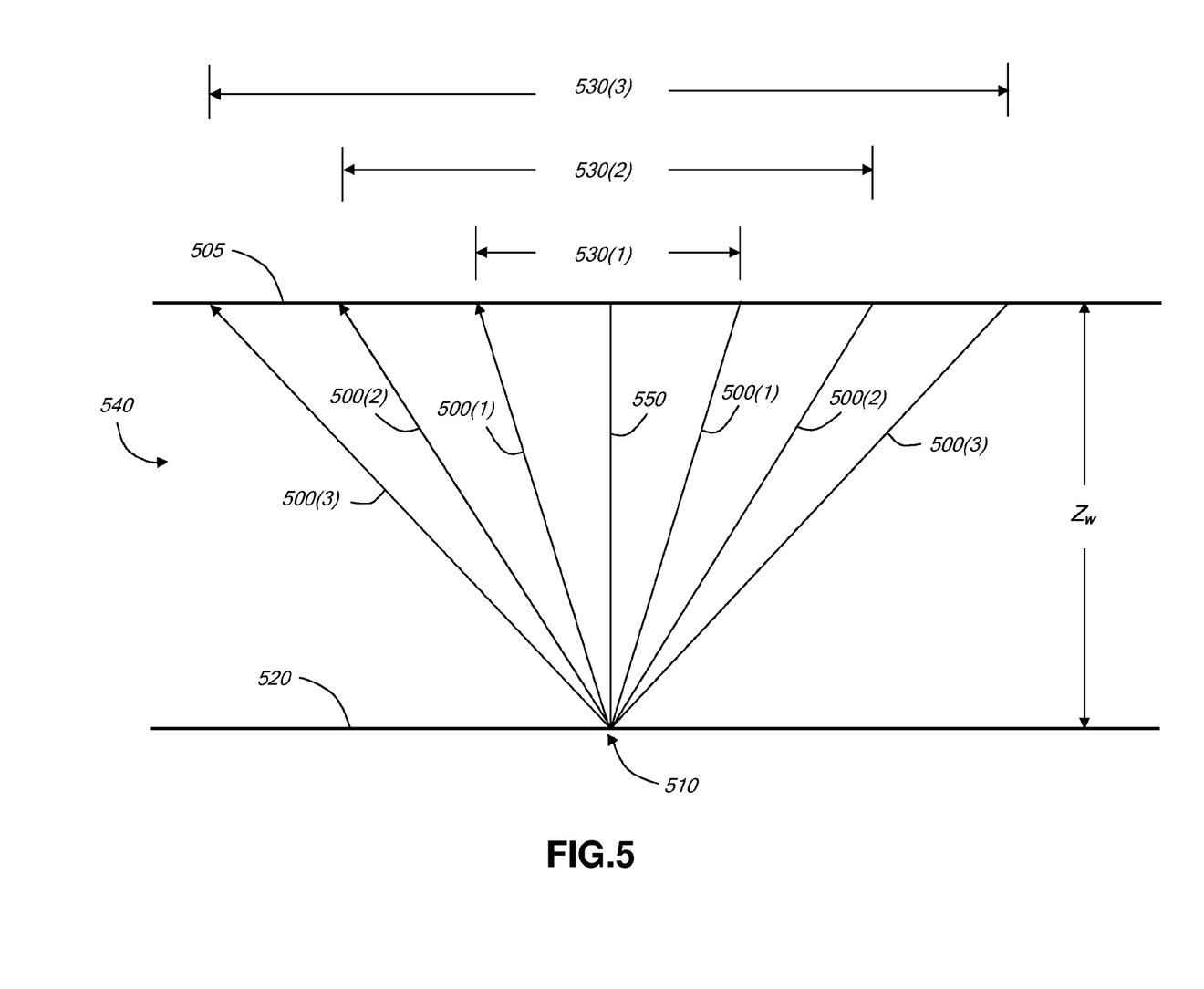
FIG. 5 illustrates a plurality of signal paths from a surface through a common midpoint cell on a sea floor and back to the surface in connection with implementations of various techniques described herein.

FIG. 5 illustrates a plurality of signal paths 500(1-3) from a surface 505 through a common midpoint cell 510 on a sea floor 520 and back to the surface 505. Each signal path 500 (1-3) has a corresponding offset 530(1-3), which represents a horizontal separation of the seismic source and seismic sensor. Thus, for a water layer 540 having a depth Z and a velocity of sound in water, or $V_w$, an acoustic signal that propagates along the signal paths 500(1-3) has a corresponding travel time $T_{1-3}$ given by the formula $T_{1-3} = (T_0^2 + X_{1-3}^2/V_w^2)^{1/2}$, where $X_{1-3}$ is the length of the corresponding offset 530(1-3) and $T_0 = 2Z_w/V_w$ is the vertical two-way travel time, i.e., the travel time of an acoustic signal propagating along the line 550. The vertical two-way travel time may also be referred to as the zero offset travel time.

When combining traces formed from signals that propagate along the signal paths 500(1-3), a so-called normal move-out (NMO) correction may be applied to the traces. The NMO correction may include transforming a time coordinate of the traces using the equation $T_{0,\,1-3} = (T_{1-3}^2 - X_{1-3}^2/V_w^2)^2$. If the water velocity $V_w$ is the same for all the traces, then the NMO-corrected travel times $T_{0,\,1-3}$ are all equal to a zero offset travel time $T_0$. Grouping and/or combining the NMO-corrected traces may often improve the representation of the marine seismic survey area 200 by, e.g., increasing the signal-to-noise ratio of the data. However, as discussed above, variations in the water conditions, e.g., water temperature, salinity, and the like, between the plurality of sail lines 200(1-2) may cause sail-line-to-sail-line variations in the water velocity, such that the NMO-corrected travel times $T_{0,\,1-3}$ may be different for different traces.

Figure 6A:
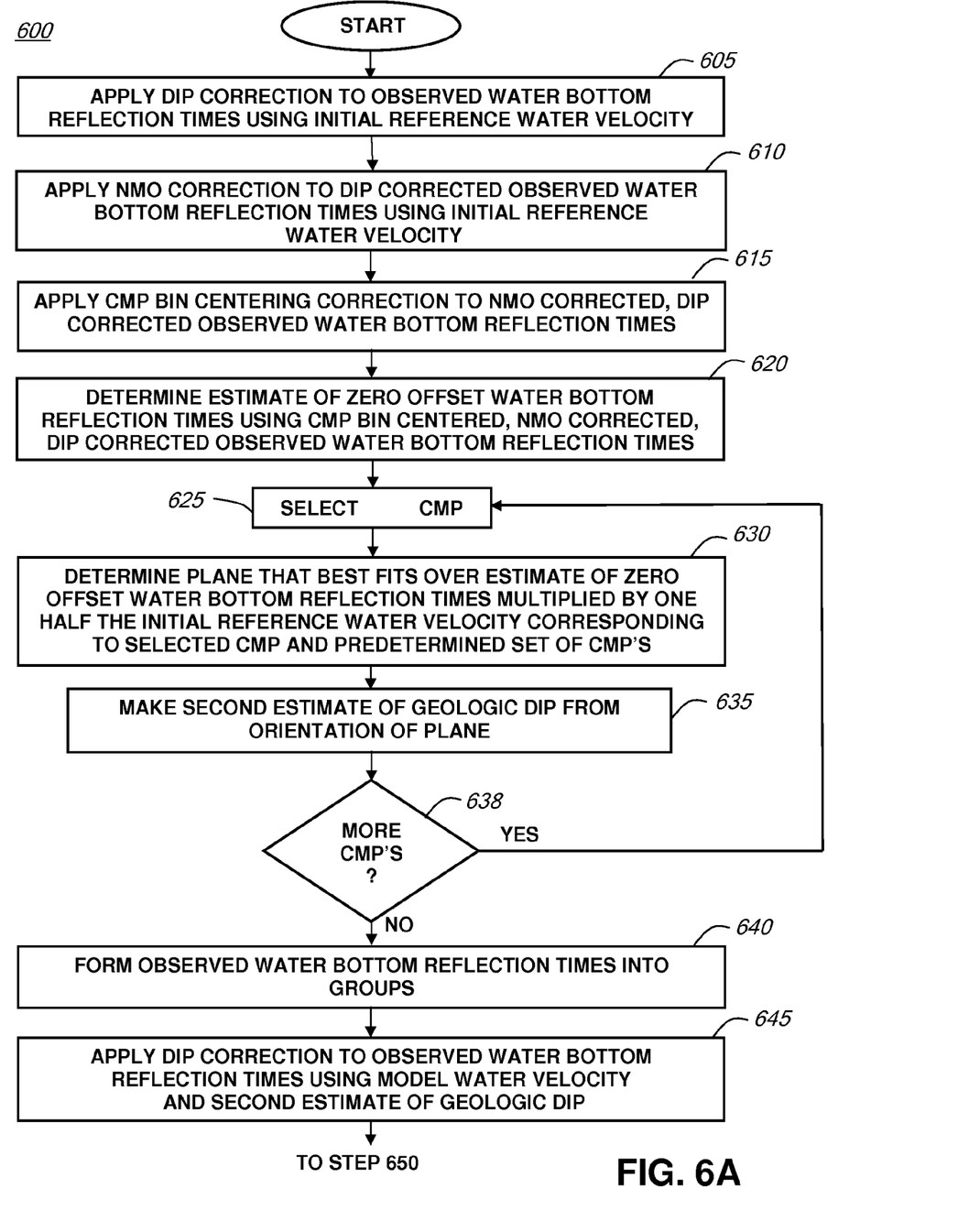
FIGS. 6A, 6B, and 6C illustrate a flow diagram of a method for correcting seismic data due to errors caused by variations in the water conditions in accordance with implementations of various techniques described herein.
Figure 6B:
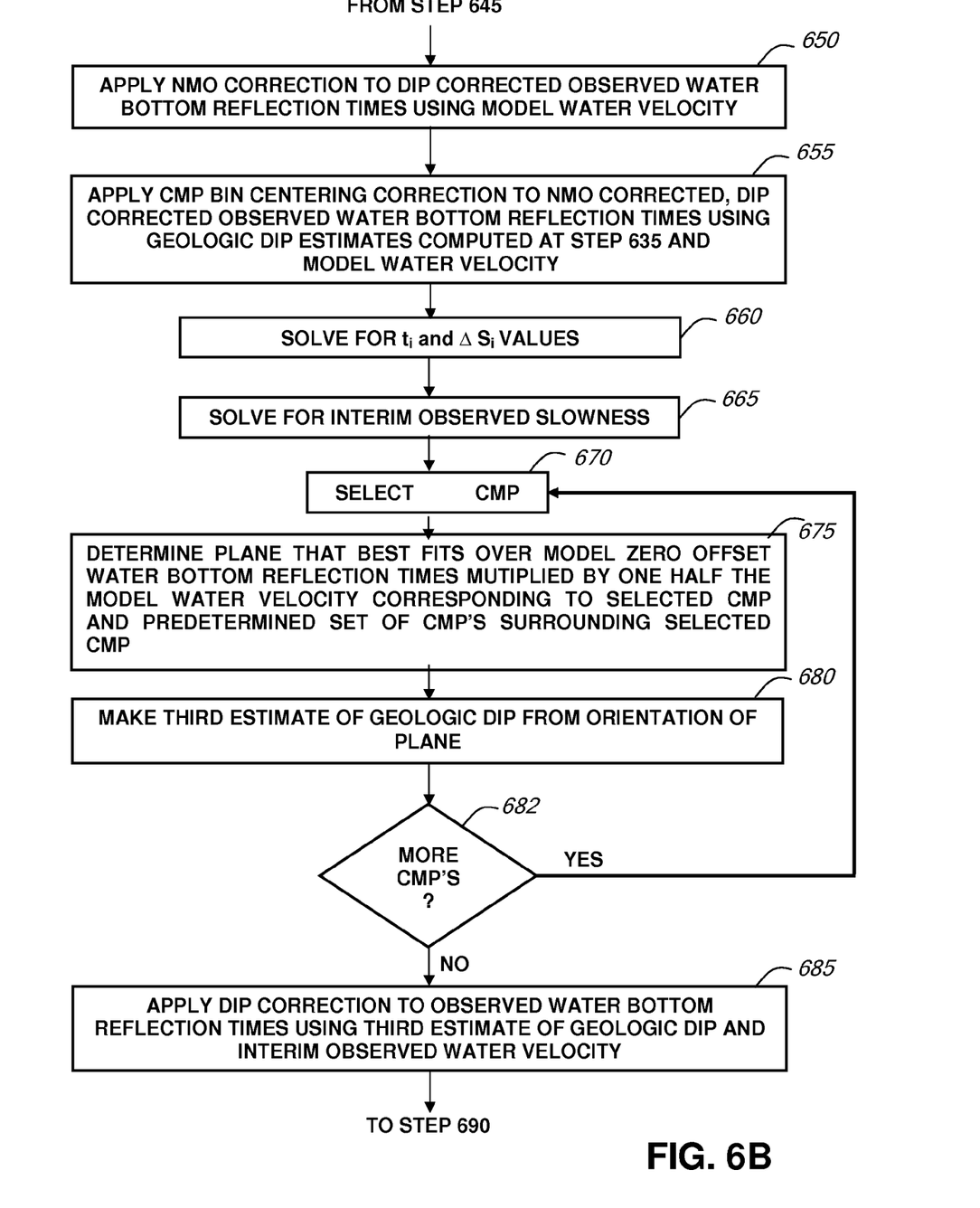
Figure 6C:
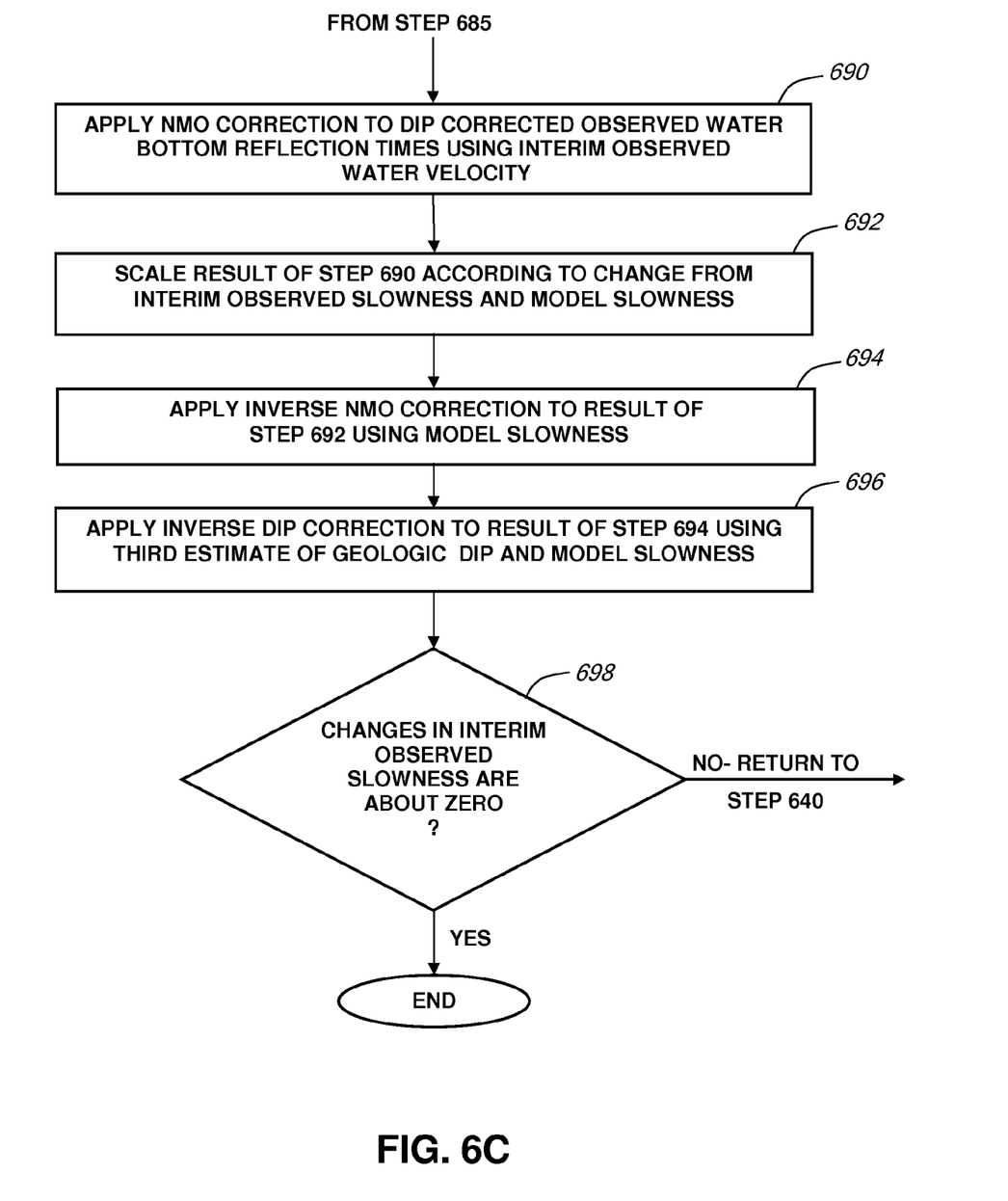

FIGS. 6A, 6B, and 6C illustrate a flow diagram of a method 600 for correcting seismic data due to errors caused by variations in the water conditions in accordance with implementations of various techniques described herein. It should be understood that while the operational flow diagram 600 indicates a particular order of execution of the operations, in some implementations, certain portions of the operations might be executed in a different order. Further, in some implementations, certain steps may be combined into fewer steps or even simplified into a single step. For example, steps 605-615 may be combined into a single step achieving the same result.

At step 605, a dip correction may be applied to a plurality of observed water bottom reflection times using an initial reference water velocity. An observed water bottom reflection time may be defined as the smallest observed two-way traveltime of a seismic event recorded at a seismic sensor and having traveled from the source to the water bottom and to the sensor. In one implementation, the dip correction may include determining the difference between the observed water bottom reflection times and the water bottom reflection times that would have been observed at the water bottom having no geologic dip and the same distance from the source-detector midpoint. This difference may then be subtracted from the observed water bottom reflection times. At step 605, the water bottom may be assumed to have a first estimate of geologic dip. The initial reference water velocity may be an estimate of the average water velocity for the acquisition area. In one implementation, the initial reference water velocity may be a function of CMP.

At step 610, an NMO correction may be applied to the dip corrected observed water bottom reflection times using the initial reference water velocity.

At step 615, a CMP bin centering correction may be applied to the NMO corrected, dip corrected observed water bottom reflection times. This step may be configured to simulate a common point for the dipping reflector for all recorded water bottom reflection times whose source-detector midpoints are within the bin. In one implementation, the CMP bin centering correction may include calculating the difference between zero offset water bottom reflection times with source and detector at the recorded source-detector midpoint and zero offset water bottom reflection times at the CMP bin midpoint using the first estimate of geologic dip at each CMP and the initial reference water velocity. This difference may then be subtracted from the NMO-corrected, dip-corrected observed water bottom reflection times. For purposes of the CMP bin centering correction, the reflector may be assumed to be planar for the water bottom reflection times with source-detector midpoints within the CMP bin. As a result, the output of step 615 may be CMP bin-centered, NMO-corrected, dip-corrected observed water bottom reflection times.

At step 620, an estimate of zero offset water bottom reflection times may be determined using the CMP bin centered, NMO corrected, dip corrected observed water bottom reflection times. A zero offset water bottom reflection time may be defined as an estimate of the water bottom reflection time of a seismic event that would have been recorded if the source and detector had been coincident at a specified x-y coordinate, such as the midpoint between the actual source and detector locations, or the center of a CMP bin. A zero offset water bottom reflection time may be associated with a certain water velocity because reflection time depends on the velocity. As such, the estimate of zero offset water bottom reflection times may be determined by determining a curve that is a best fit of the CMP bin centered corrected, NMO corrected, dip corrected observed water bottom reflection times and residual moveout. The curve may be best fitted using a least squares equation. For example, a residual moveout curve and zero offset water bottom reflection times may be best fitted into the CMP bin centered, NMO corrected, dip corrected water observed water bottom reflection times. In one implementation, a function $\epsilon$ of the desired curves and water bottom reflection times may be formulated as follows:

$$\epsilon = |\tau_{ij} - t_j + \alpha_j X_{ij}^2|^2$$

where $\tau_{ij}$ is the $i^{th}$ CMP bin centered, NMO corrected, dip corrected observed water bottom reflection time of the CMP bin centered, NMO corrected, dip corrected water observed water bottom reflection times in the $j^{th}$ CMP, $t_j$ is the zero offset water bottom reflection times estimate of the $j^{th}$ CMP, and $\alpha_j$ is the residual moveout parameter of the $j^{th}$ CMP such that $\alpha_j$ is smooth. The function $\epsilon$ may then be minimized according to various numerical analysis methods, such as those described in Press, W., et al., 1996, Numerical Recipes in Fortran, $2^{nd}$ ed, Cambridge University Press.

The residual moveout may refer to a small amount of NMO that remains after the NMO correction applied at step 610. The NMO correction applied at step 610 may be incomplete because the velocity used for the NMO correction may be incorrect. As such, the residual moveout and zero offset water bottom reflection times may be determined using the CMP bin-centered, NMO-corrected, dip-corrected observed water bottom reflection times as described above.

Figure 8A:
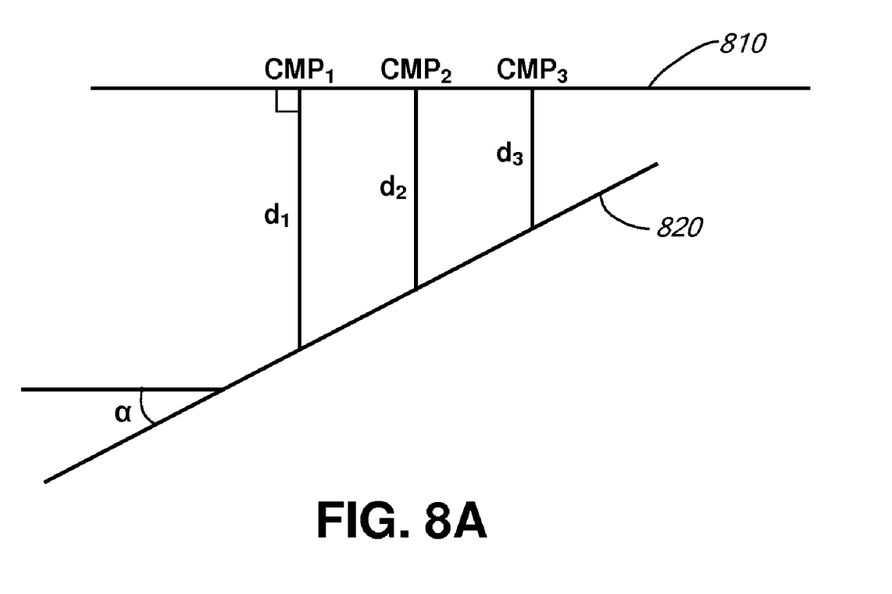
FIGS. 8A and 8B illustrate a cross sectional view of a plurality of signal paths perpendicular to the direction of geologic strike in accordance with implementations of various techniques described herein.
Figure 8B:
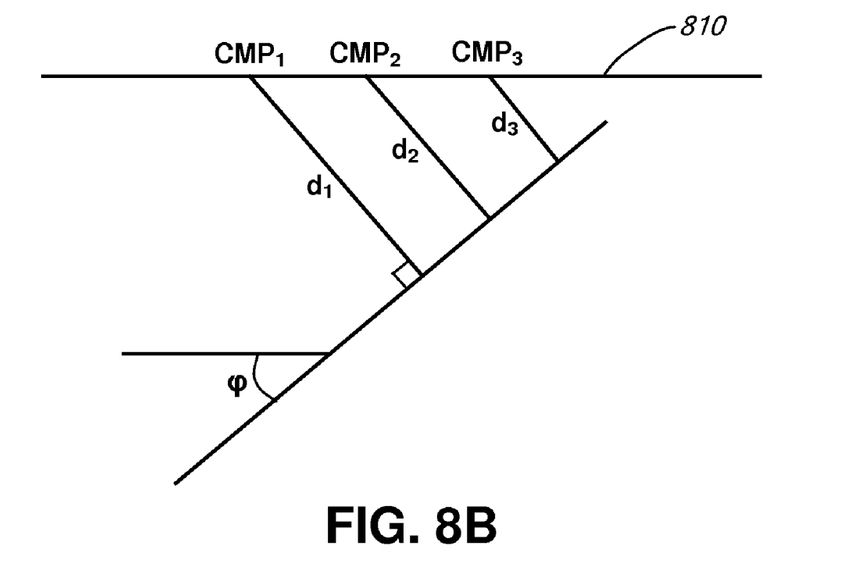

At step 625, a CMP may be selected. At step 630, a plane that best fits over the estimate of zero offset water bottom reflection times multiplied by one-half the initial reference water velocity that correspond to the selected CMP and a predetermined set of CMP's surrounding the selected CMP may be determined. At step 635, the orientation of the plane may be considered as a second estimate of geologic dip at the selected CMP. In one implementation, the angle whose sine is the tangent of the slope of the plane in its steepest direction may be considered as a second estimate of geologic dip at the selected CMP. This process may also be referred to as migration. FIG. 8A illustrates a cross sectional view of a plurality of signal paths perpendicular to the direction of geologic strike. More specifically, $d_1$, $d_2$, $d_3$ indicate the various distances from the water surface 810 to the plane 820 of the water bottom surface referred to at step 635. That is, $d_1$, $d_2$, $d_3$ represent the zero offset times multiplied by ½ the reference water velocity. $\alpha$ represents the angle of the slope of the plane in the direction of the plane's maximum slope. FIG. 8B illustrates a cross sectional view of a plurality of signal paths perpendicular to the direction of geologic strike. In this figure, the water surface 810 and $d_1$, $d_2$, $d_3$ are the same as shown in FIG. 8A. $\phi$ represents the angle whose sine is the tangent of the slope of the plane 820 in its steepest direction.

Using step 638, steps 625-635 may then be repeated for all CMP's to generate a second estimate of geologic dip for each CMP. The geologic dip may provide a value of the direction and slope of the water bottom surface. As such, each CMP may have its own estimate of geologic dip.

At step 640, the observed water bottom reflection times may be formed into groups. In one implementation, the observed water bottom reflection times may be grouped according to the method with reference to FIG. 4. In another implementation, the groups may be formed such that a subset of each group may consist of a single-cable sail line cross line group. In yet another implementation, the grouping may be based on a sail line that have source-detector midpoints disposed in a line of cells along the perpendicular axis of a grid that has its axes approximately along and perpendicular to the track of the sail line. The grid used to construct this grouping may be independent of the CMP grid used in method 600. In general, if the CMP grid and the grouping grid would have roughly the same orientation, then it may not be necessary to have a separate grid for the grouping. However, when sail lines are not roughly parallel, e.g., when a survey is acquired with two or more non-parallel orientations of the sail lines, it may be necessary to have different grids for the forming of groups. The point of the grouping is that each group may have a distribution of offsets over the nominal range of acquired offsets and that the source-detector midpoints of a group be in proximity to each other.

At step 645, a dip correction may be applied to the observed water bottom reflection times using a model water velocity and the second estimate of geologic dip computed for each CMP at step 635. The model water velocity may be a constant or a function of CMP. The model water velocity may be specified by the user or calculated in a separate procedure. In one implementation, the model water velocity may be the water velocity that the user believes is the best NMO velocity to which the observed water bottom reflection times will be "layer replaced," which is a process that will be described in more detail in the paragraphs below.

At step 650, an NMO correction may be applied to the dip corrected observed water bottom reflection times using the model water velocity.

At step 655, a CMP bin centering correction may be applied to the NMO corrected, dip corrected observed water bottom reflection times using the geologic dip estimates computed for each CMP computed at step 635 and the model water velocity.

At step 660, values for $t_i$ and $\Delta s_i$ that minimize e as expressed in the following equation may be solved.

$$e = \Sigma |t_{nobs,i} - (t_i + \Delta s_i a(t_m, s_m))|^r$$

$$1 \leq r \leq 2$$

where $a(t_m, s_m) = t_{mx}^2/(S_m t_m)$, and $t_{mx}^2 = t_m^2 + (x_{nobs} s_m)^2$ where r is the "norm" of the solution. When r is 1, i.e., an L−1 norm, e, which is a measure of goodness of fit, is a solution of the least absolute deviation. When r is 2, it is a least squares solution. $t_{nobs,i}$ is a CMP-bin centered, NMO corrected, dip corrected observed water bottom reflection time of the $i^{th}$ iteration, i.e., the $i^{th}$ iteration from steps 640 through 696. $t_i$ is a function of CMP bin and is an estimate for the $i^{th}$ iteration of the zero offset water bottom reflection time that would have been observed with source and detector coincident at the CMP midpoint and the model water velocity; and $\Delta s_i$ is a function of group, i.e., a group of water bottom reflection times may be associated with a single value of $\Delta s_i$. In other words, $\Delta s_i$ is the estimate of the difference in slowness between the observed water bottom reflection times and the water bottom reflection times that would have been observed had the water velocity been the model water velocity, i.e., for the $i^{th}$ iteration. $t_m$ is the model time, which is the estimate of zero offset water bottom reflection time at the midpoint of the CMP bin when the water velocity is equal to the model water velocity. The model time $t_m$ for the first iteration is the $t_j$'s calculated at step 620. $s_m$ is the model slowness, which may be defined as the reciprocal of the model water velocity. a is defined as a non-linear function of the model zero offset water bottom reflection time $t_m$ and the model slowness $s_m$, which themselves are functions of CMP bin. $t_{mx}$ is defined as $t_m$ with inverse moveout at the model slowness, $s_m$, and the distance between the source and detector of the time $t_{nobs,i}$ which is $x_{nobs}$.

At step 665, an interim observed slowness $s_{obs,i}$ may be solved based on the following equation $s_{obs,i} = s_a + \Delta s_i$, where $s_a$ is the average of $s_m$ taken for the observed water bottom reflection times of the group. The interim observed slowness $s_{obs,i}$ is the reciprocal of observed water velocity, which is an estimate of the average water velocity experienced by the seismic energy traveling through the water during acquisition, i.e., the water velocity "observed" in the acquired seismic data.

At step 670, a CMP may be selected. At step 675, a plane that best fits over the zero offset water bottom reflection times $t_i$ multiplied by one-half the model water velocity corresponding to the selected CMP and a predetermined set of CMP's surrounding the selected CMP may be determined. At step 680, the orientation of the plane may be considered as a third estimate of geologic dip at the selected CMP. In one implementation, the angle $\phi$ whose sine is the tangent of the slope of the plane 820 in its steepest direction may be considered as a third estimate of geologic dip at the selected CMP. The angle $\phi$ and the plane 820 are described in more detail in the above paragraphs with reference to FIGS. 8A and 8B. Using step 682, steps 670-680 may then be repeated for all CMP's to generate a third estimate of geologic dip for each CMP.

At step 685, a dip correction may be applied to the observed water bottom reflection times using the third estimates of geologic dip and the interim observed water velocity, which is the reciprocal of the slowness computed at step 665.

At step 690, an NMO correction may be applied to the dip corrected observed water bottom reflection times using the interim observed water velocity.

At step 692, the NMO corrected, dip corrected observed water bottom reflection times may be scaled according to the change from the interim observed slowness $s_{obs,i}$ and the model slowness $s_m$ using the following relationship.

$$t_b/s_{obs,i} = t_r/s_m$$

where $t_b$ is the NMO corrected, dip corrected observed water bottom reflection times, and $t_r$ is the scaled result time.

At step 694, an inverse NMO correction may be applied to the scaled, NMO corrected, dip corrected observed water bottom reflection times using the model slowness $s_m$.

At step 696, an inverse dip correction may be applied to the inverse NMO corrected, scaled, NMO corrected, dip corrected observed water bottom reflection times using the third estimates of geologic dip and the model slowness $s_m$. The output of this step is the water bottom reflection times that would have been observed if the water velocity (slowness) were $s_m$ and the actual observed velocity were the interim observed water velocity, which is the reciprocal of the interim observed slowness $s_{obs,i}$ computed at step 665. In this manner, the observed water bottom reflection times may be layer replaced.

At step 698, steps 640-696 may be repeated using the layer replaced water bottom reflection times in place of the observed water bottom reflection times and substituting $s_{obs,i} = s_{obs,i-1} + \Delta s_i$ for $s_{obs,i} = s_a + \Delta s_i$, where $s_{obs,i-1}$ is $s_{obs,i}$ of the previous step 665. This repetition may be performed until the changes in the interim observed slowness $s_{obs,i}$ from subsequent iterations are about zero. As such, the final output of method 600 may be a final value of observed water velocity, which is the reciprocal of the final interim observed slowness $s_{obs,i}$. As mentioned above, the observed water velocity may be defined as the localized average velocity of the water at the time of acquisition. The observed water velocity may also be described as the velocity that, when replaced with the model water velocity in a layer replacement calculation, changes the observed water bottom reflection times to those that would have been observed had the water velocity at the time of acquisition been the model water velocity.

In one implementation, at step 645, the dip correction may be applied to the layer replaced water bottom reflection times using estimates of geologic dip determined at step 670 in the second and subsequent iterations. In another implementation, at step 650, the NMO correction may be applied to the dip corrected, layer replaced water bottom reflection times in the second and subsequent iterations. In yet another implementation, at step 655, the CMP bin centering correction may be applied to the NMO corrected, dip corrected, layer replaced water bottom reflection times in the second and subsequent iterations. In still another implementation, for second and subsequent iterations, $t_m$ is the $t_i$ computed in step 660 of the previous iteration.

In one implementation, the model water velocity may be the NMO velocity equivalent to the RMS water velocity, or even the RMS water velocity itself, which may be defined as the root mean square water velocity of all the layers. The RMS water velocity may be calculated from the thickness and velocity of all the layers as expressed in the following equation:

$$V_{rms} = [\Sigma_i V_i^2 t_i / \Sigma_i t_i]^{1/2},$$

where $z_i$ is the layer thickness, $V_i$ is velocity and $t_i = z_i/V_i$ is the vertical travel time across the layer of thickness $z_i$ and velocity $V_i$.

In another implementation, the model water velocity may be constant for the first iteration. An RMS water velocity may then calculated for each CMP from the model zero offset water bottom reflection times $t_m$ and a specified layering of velocities in the water layer. This RMS water velocity (as a function of CMP) may then be used as the model water velocity in subsequent iterations.

As such, although various implementations described herein may be used to estimate the observed RMS water velocity associated with any reflecting horizon, one primary use is in finding the velocity of sound in the water layer as it varies laterally and temporally during the recording of marine 3-D surveys.

In another implementation, the observed water velocity from the first iteration where the model water velocity is a constant may be spatially smoothed to produce another model water velocity that is close to the observed water velocity. The spatially smoothed observed water velocity may then be used as the model water velocity in subsequent iterations. Because the difference between the observed velocity and the spatially smoothed observed water velocity is small, layer replacement of the observed water bottom reflection times using the observed velocity and the spatially smoothed observed water velocity may not move the seismic data very much, which may be desirable.

Figure 7:
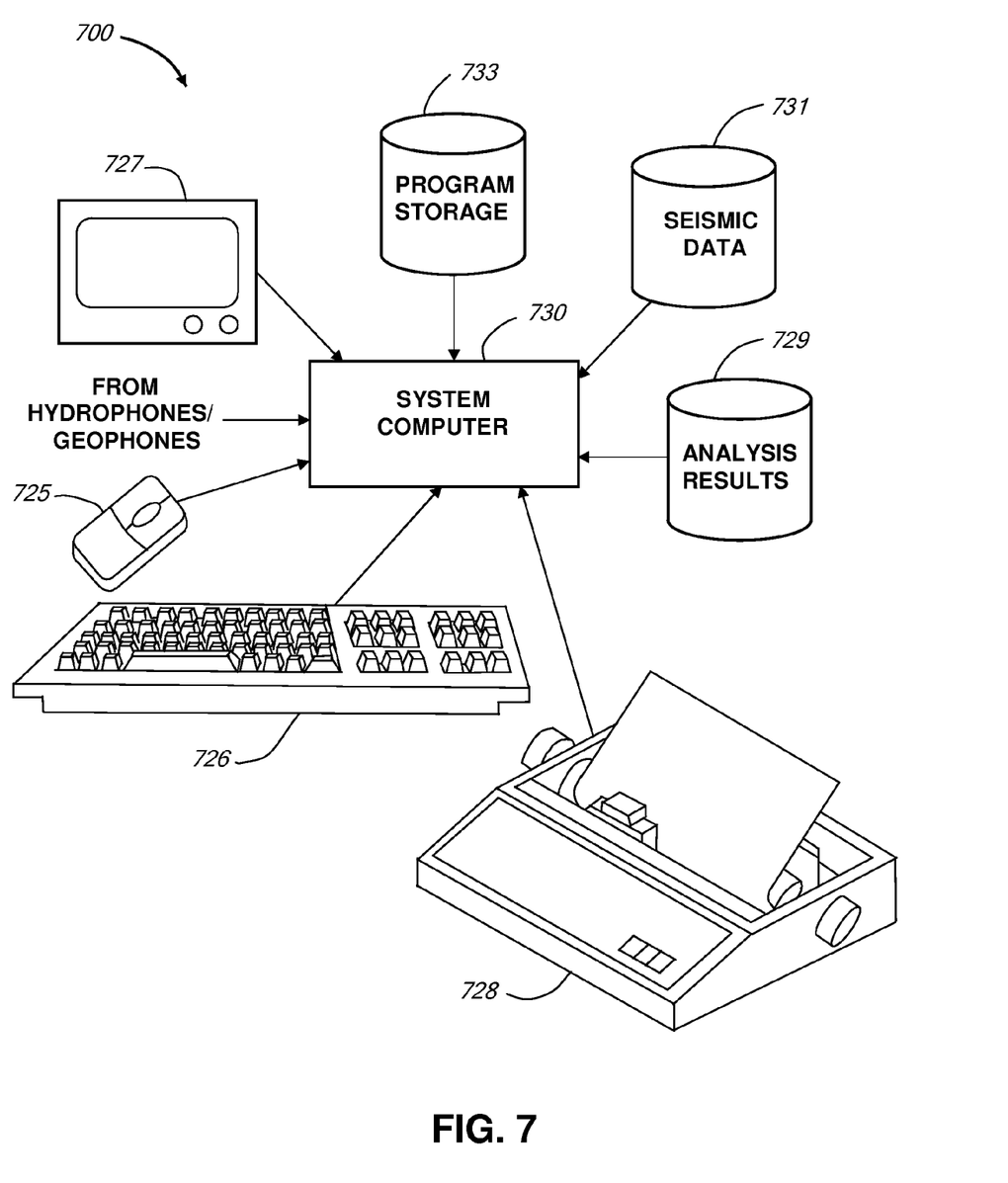
FIG. 7 illustrates a computing system, into which implementations of various technologies described herein may be implemented.

FIG. 7 illustrates a computing system 700, into which implementations of various technologies described herein may be implemented. The computing system 700 may include one or more system computers 730, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 730 may be in communication with disk storage devices 729, 731, and 733, which may be external hard disk storage devices. It is contemplated that disk storage devices 729, 731, and 733 are conventional hard disk drives, and as such, will be implemented by way of a local area network or by remote access. Of course, while disk storage devices 729, 731, and 733 are illustrated as separate devices, a single disk storage device may be used to store any and all of the program instructions, measurement data, and results as desired.

In one implementation, seismic data from the receivers may be stored in disk storage device 731. The system computer 730 may retrieve the appropriate data from the disk storage device 731 to process seismic data according to program instructions that correspond to implementations of various techniques described herein. The program instructions may be written in a computer programming language, such as C++, Java and the like. The program instructions may be stored in a computer-readable medium, such as program disk storage device 733. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 730. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 730 may present output primarily onto graphics display 727, or alternatively via printer 728. The system computer 730 may store the results of the methods described above on disk storage 729, for later use and further analysis. The keyboard 726 and the pointing device (e.g., a mouse, trackball, or the like) 725 may be provided with the system computer 730 to enable interactive operation.

The system computer 730 may be located at a data center remote from the survey region. The system computer 730 may be in communication with the receivers (either directly or via a recording unit, not shown), to receive signals indicative of the reflected seismic energy. These signals, after conventional formatting and other initial processing, may be stored by the system computer 730 as digital data in the disk storage 731 for subsequent retrieval and processing in the manner described above. While FIG. 7 illustrates the disk storage 731 as directly connected to the system computer 730, it is also contemplated that the disk storage device 731 may be accessible through a local area network or by remote access. Furthermore, while disk storage devices 729, 731 are illustrated as separate devices for storing input seismic data and analysis results, the disk storage devices 729, 731 may be implemented within a single disk drive (either together with or separately from program disk storage device 733), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data to be used in correcting for errors caused by variation in water conditions, the method performed by a computer system comprising:
   (a) solving, by the computer system, for $\Delta s_i$ based on CMP-bin centered, NMO corrected, dip corrected observed water bottom reflection times, wherein $\Delta s_i$ is an estimate of the difference in slowness between one or more observed water bottom reflection times and one or more water bottom reflection times that would have been observed had a water velocity for the observed water bottom reflection times been the same as a model water velocity;
   (b) solving, by the computer system, for an estimate of observed water velocity based on $s_{obs,i} = s_m + \Delta s_i$, where $s_{obs,i}$ is an estimate of observed slowness and $s_m$ is defined as a model slowness; and
   (c) layer replacing, by the computer system, the observed water bottom reflection times using the estimate of the observed water velocity and the model water velocity.

2. The method of claim 1, further comprising repeating, by the computer system, steps (a) to (c) using the layer replaced observed water bottom reflection times until the changes in the estimate of observed water velocity approach zero.

3. The method of claim 1, further comprising (d) applying, by the computer system, a dip correction to the observed water bottom reflection times using the model water velocity and an estimate of geologic dip.

4. The method of claim 3, further comprising (e) applying, by the computer system, a normal moveout (NMO) correction to the dip corrected observed water bottom reflection times using the model water velocity.

5. The method of claim 4, further comprising (f) applying, by the computer system, a common mid point ("CMP") bin centering correction to the NMO corrected, dip corrected observed water bottom reflection times using the model water velocity and the estimate of geologic dip.

6. The method of claim 1, further comprising repeating, by the computer system, steps (a) to (f) using the layer replaced observed water bottom reflection times until the changes in the estimate of observed water velocity approach zero.

7. The method of claim 1, further comprising (e) applying, by the computer system, a normal moveout (NMO) correction to the observed water bottom reflection times using the model water velocity.

8. The method of claim 1, further comprising (f) applying, by the computer system, a common mid point ("CMP") bin centering correction to the observed water bottom reflection times using the model water velocity and an estimate of geologic dip.

9. The method of claim 1, further comprising correcting, by the computer system, the seismic data using the estimate of the observed water velocity.

10. The method of claim 1, wherein the model slowness is the reciprocal of the model water velocity.

11. The method of claim 1, further comprising forming, by the computer system, the observed water bottom reflection times into groups such that a subset of each group comprises a single cable sail line cross line group.

12. The method of claim 1, further comprising forming, by the computer system, the observed water bottom reflection times into groups such that each group has a distribution of offsets over a range of acquired offsets and that the source-detector midpoints of each group be in proximity to each other.

13. A non-transitory computer-readable medium containing computer instructions stored therein for causing a computer processor to:
(a) solve for $\Delta s_i$, which is an estimate of the difference in slowness between one or more observed water bottom reflection times and one or more water bottom reflection times that would have been observed had a water velocity for the observed water bottom reflection times been the same as a model water velocity; and
(b) solve for an estimate of observed water velocity based on $s_{obs,i} = s_m + \Delta s_i$, where $s_{obs,i}$ is an estimate of observed slowness and $s_m$ is defined as a model slowness.

14. The non-transitory computer-readable medium of claim 13, further comprising computer-executable instructions which, when executed by a computer, cause the computer to (c) layer replace the observed water bottom reflection times using the estimate of the observed water velocity and the model water velocity.

15. The non-transitory computer-readable medium of claim 14, further comprising computer-executable instructions which, when executed by a computer, cause the computer to repeat steps (a) to (c) using the layer replaced observed water bottom reflection times until the changes in the estimate of observed water velocity approach zero.

16. The non-transitory computer-readable medium of claim 13, further comprising computer-executable instructions which, when executed by a computer, cause the computer to (d) apply a dip correction to the observed water bottom reflection times using the model water velocity and an estimate of geologic dip.

17. The non-transitory computer-readable medium of claim 16, further comprising computer-executable instructions which, when executed by a computer, cause the computer to (e) apply a normal moveout (NMO) correction to the dip corrected observed water bottom reflection times using the model water velocity.

18. The non-transitory computer-readable medium of claim 17, further comprising computer-executable instructions which, when executed by a computer, cause the computer to (f) apply a common mid point ("CMP") bin centering correction to the NMO corrected, dip corrected observed water bottom reflection times using the model water velocity and the estimate of geologic dip.

19. The non-transitory computer-readable medium of claim 18, further comprising computer-executable instructions which, when executed by a computer, cause the computer to (g) layer replace the observed water bottom reflection times using the estimate of the observed water velocity and the model water velocity.

20. The non-transitory computer-readable medium of claim 19, further comprising computer-executable instructions which, when executed by a computer, cause the computer to repeat steps (a) to (g) using the layer replaced observed water bottom reflection times until the changes in the estimate of observed water velocity approach zero.

* * * * *